United States Patent [19]

Igoe

[11] 4,219,583
[45] Aug. 26, 1980

[54] PROCESS OF INCREASING VISCOSITY IN AGITATED MILK SYSTEMS

[75] Inventor: Robert S. Igoe, San Diego, Calif.

[73] Assignee: Merck & Co., Inc., Rahway, N.J.

[21] Appl. No.: 3,190

[22] Filed: Jan. 15, 1979

[51] Int. Cl.$^2$ .............................................. A23C 9/10
[52] U.S. Cl. .................................. 426/580; 426/590; 426/573
[58] Field of Search ................ 426/573, 575, 580, 590

[56] References Cited

U.S. PATENT DOCUMENTS

| 2,808,337 | 10/1957 | Gibsen | 426/575 |
| 2,859,115 | 11/1958 | Rivoche | 426/575 |
| 3,499,768 | 3/1970 | Moirano | 426/575 |
| 3,507,664 | 4/1970 | Schuppner | 426/573 |

*Primary Examiner*—Robert A. Yoncoskie
*Attorney, Agent, or Firm*—Gabriel Lopez; Hesna J. Pfeiffer; Julian S. Levitt

[57] ABSTRACT

A process for increasing the viscosity of cold milk under agitation is provided, which comprises of adding a blend of a phosphate such as sodium hexametaphosphate, sodium tripolyphosphate, or tetrasodiumpolyphosphate (TSPP) and a gum such as guar gum, carboxymethyl cellulose, or xanthan gum to milk. Preferably, approximately equal weights of the TSPP and xanthan gum are used, and about 0.05–1% of xanthan gum is in the final cold milk mix.

8 Claims, No Drawings

PROCESS OF INCREASING VISCOSITY IN AGITATED MILK SYSTEMS

RELATIONSHIP TO THE PRIOR ART

Phosphates and gums have been used, separately and together, in milk or milk and sugar mixes to stabilize milk proteins, sequester polyvalent cations, control rate of gelation, increase gel strength, and provide gels. See, for instance, the chapter by Sand and Sodano, "Interactions Between Phosphates and Gelling and Thickening Agents" in Deman et al., *Symposium: Phosphates in Food Processing*, Avi, Westport, Conn., 1971. In aqueous systems containing gums, small amounts of salts to some degree cause an increase in viscosity but greater amounts cause a decrease. A typical salt effect on gelation viscosity is illustrated on p. 96 in the above cited chapter.

SUMMARY OF THE INVENTION

It has now been found, surprisingly, that TSPP and xanthan gum, or other gums such as guar, and carboxymethyl cellulose, when added to cold milk under agitation, significantly increase the viscosity of the cold milk system. This viscosity lasts long enough to be able to use this invention to prepare a milk-shake type preparation, and serve it to a customer for consumption within a reasonable time, and have it remain in its thickened state during consumption and extended preparation.

The system to which this process is particularly suited is a continuously stirred or circulating drink dispenser, such as is commonly seen to serve fruit juice drinks or the like. When milk, sugar, flavoring, and the gum blend of this invention are employed in such a machine, the resulting cold milk mix is milk-shake like in viscosity.

The cold milk used is at normal refrigeration temperatures, for example, between 35° F. and 45° F.

Although TSPP is the best phosphate used, and is preferred in the practice of this invention, other phosphates, such as sodium hexametaphosphate, sodium tripolyphosphate and others, can be used.

The greatest viscosity increase comes from a premixed blend of xanthan gum and TSPP. This blend can be in dry form, or in an aqueous concentrate, which can be diluted up to about five or more times with milk to get the final use range.

The TSPP and the xanthan gum are employed in approximately equal amounts in the mix. Operably from 40:60 to 60:40 of each can be used (weight basis). However, up to two times as much TSPP can be used as xanthan gum, if desired. The final level of both in the milk is between about 0.05 to about 1% (weight-/volume basis). A more preferred range is about 0.075% to about 0.6%, and even more preferred, from about 0.09% to about 0.3%.

Surprisingly, the increase in viscosity was only observed in the xanthan gum-TSPP where used in milk systems. In water, no significant viscosity increase is noted, for example, see Table I.

TABLE I

| In water | Viscosity |
|---|---|
| 0.3% xanthan gum | 630 |
| 0.3% xanthan gum + 0.4% TSPP | 700 |
| 0.3% xanthan gum + 0.8 TSPP | 620 |
| 0.8% TSPP | 17 |

In a milk system, the following general procedure was used.

A dry blend of xanthan gum or other gums, i.e., guar, carboxymethyl cellulose, and TSPP mixture was dispersed with five times its weight with sugar and added to cold mix under a constant mixing speed (about 400 RPM) for 5 minutes. This equipment used was a T-line laboratory stirrer although any suitable mechanical stirrer would function. Viscosity was measured on a Brookfield viscometer, Model LVT. The results show a significant viscosity increase is obtained with the inclusion of TSPP. The gum concentration was 0.6% and TSPP was added at 0.8%, see Table II.

TABLE II

| | |
|---|---|
| 0.8% TSPP | 70 cps |
| 0.6% xanthan gum | 510 cps |
| 0.6% xanthan gum/0.8% TSPP | 1500 cps |
| 0.6% guar | 310 cps |
| 0.6% guar/0.8% TSPP | 840 cps |
| 0.6% CMC 7m8SF | 80 cps |
| 0.6% CMC 7m8SF/0.8% TSPP | 400 cps |

Another process employed an aqueous concentration of xanthan gum and TSPP. This concentrate contained either 0.54% xanthan gum (mix A), or 0.45% xanthan gum and about 1% TSPP (mix B). These concentrates were diluted 1:5 with milk. After dilution, mix A contained about 0.09% xanthan gum, and mix B contained about 0.075% xanthan gum and 0.16% TSPP. Viscosity was measured on a Brookfield viscometer, Model LVT apparatus under the following conditions: One part concentrate was added to five parts cold milk while stirring. At specified time periods, mix viscosity was obtained and then stirring continued until following viscosity reading. Viscosity reports were obtained after the indicated elapsed time in minutes and indicate that although mix B contains less xanthan gum than mix A, higher viscosities are obtained after 5 minutes mixing.

TABLE III

| Minutes | Mix A | Mix B |
|---|---|---|
| 1 | 82 | 65 |
| 5 | 110 | 90 |
| 10 | 65 | 245 |
| 20 | 50 | 120 |
| 30 | 40 | 100 |
| | (cps) | (cps) |

The following example indicates that the maximum viscosity is found at about a 1:2–2:1 ratio of the xanthan gum and TSPP:

TABLE IV

| Blend Ratios | Viscosity |
|---|---|
| xanthan:TSPP | (at 0.6% xanthan gum concentration in cold milk) |
| 1:1 | 1500 cps |
| 1:2 | 1490 cps |
| 1:4 | 1340 cps |
| 2:1 | 1550 cps |
| 6:1 | 700 cps |

What is claimed is:

1. The process for increasing the viscosity without solidification of a fluid milk mix at normal refrigeration temperatures under agitation which comprises adding to said milk mix a premixed blend, in either dry or aqueous concentrate form, consisting essentially of a gum and a phosphate wherein said gum is selected from the group consisting of xanthan gum, guar gum, and carboxymethyl cellulose and said phosphate is selected from the group consisting of sodium hexametaphosphate, sodium tripolyphosphate, and tetrasodiumpolyphosphate (TSPP), the blend of the two components being in approximately equal weight amounts; the amount of the pre-mixed blend added being such that from about 0.05% to about 1% gum (weight/volume) is in the milk mix.

2. The process of claim 1 wherein the gum is xanthan gum.

3. The process of claim 2 wherein the phosphate is TSPP and the level of gum is from about 0.09% to about 0.3%.

4. The process of claim 1 wherein the gum is guar gum.

5. The process of claim 1 wherein the gum is carboxymethyl cellulose.

6. The process of claims 2, 4, or 5 wherein the phosphate is TSPP.

7. The process of claim 6 wherein the level of gum in the milk mix is from about 0.075% to about 0.68%.

8. The process of claim 6 wherein the gum and TSPP is employed in ratios ranging from 40:60 parts to 60:40 parts, respectively.

* * * * *

UNITED STATES PATENT AND TRADEMARK OFFICE
CERTIFICATE OF CORRECTION

PATENT NO. : 4,219,583
DATED : August 26, 1980
INVENTOR(S) : Robert S. Igoe

It is certified that error appears in the above–identified patent and that said Letters Patent are hereby corrected as shown below:

In claim 7, line 2, please delete "0.68%" and insert therefor -- 0.6%. --

[SEAL]

Attest:

Attesting Officer

Signed and Sealed this

Twenty-fifth Day of November 1980

SIDNEY A. DIAMOND

Commissioner of Patents and Trademarks